United States Patent [19]

Habermeier

[11] 4,002,600
[45] Jan. 11, 1977

[54] LINEAR COPOLYESTERS BASED ON TEREPHTHALIC ACID AND/OR ISOPHTHALIC ACID, A PROCESS FOR THEIR MANUFACTURE AND THEIR USE

[75] Inventor: Jürgen Habermeier, Pfeffingen, Switzerland

[73] Assignee: Ciba-Geigy Corporation, Ardsley, N.Y.

[22] Filed: Nov. 5, 1975

[21] Appl. No.: 629,154

Related U.S. Application Data

[63] Continuation-in-part of Ser. No. 449,175, March 7, 1974, abandoned.

[30] Foreign Application Priority Data

Mar. 27, 1973 Switzerland............... 04399/73

[52] U.S. Cl. ............................................ 260/75 N
[51] Int. Cl.$^2$ ................................... C08G 63/68
[58] Field of Search ................................ 260/75 N

[56] References Cited

UNITED STATES PATENTS

| | | | |
|---|---|---|---|
| 2,851,443 | 9/1958 | Williams et al. | 260/75 N |
| 2,861,055 | 11/1958 | Williams et al. | 260/75 N |
| 2,956,984 | 10/1960 | Reynolds et al. | 260/75 N |

FOREIGN PATENTS OR APPLICATIONS

| | | |
|---|---|---|
| 2,150,808 | 4/1972 | Germany |

*Primary Examiner*—Murray Tillman
*Assistant Examiner*—W. C. Danison, Jr.
*Attorney, Agent, or Firm*—Charles W. Vanecek

[57] ABSTRACT

New linear copolyesters containing amide groups are obtained by polycondensing certain dicarboxylic acid diamides which are obtained by reaction of 1 mol of an aromatic, cycloaliphatic or cycloaliphatic-aliphatic diamine with 2 mols of terephthalic acid, isophthalic acid or their polyester-forming derivatives, together with terephthalic acid, isophthalic acid or their polyester-forming derivatives and with alkanediols to a relative viscosity greater than 1.2. The new copolyesters containing amide groups are valuable engineering thermoplastic materials which are easily processible and give moulding materials with good thermo-mechanical properties.

2 Claims, No Drawings

LINEAR COPOLYESTERS BASED ON TEREPHTHALIC ACID AND/OR ISOPHTHALIC ACID, A PROCESS FOR THEIR MANUFACTURE AND THEIR USE

This application is a continuation-in-part application of our copending application Ser. No. 449,175, filed Mar. 7, 1974 now abandoned.

The present invention relates to new, linear copolyesters based on terephthalic acid and/or isophthalic acid as well as alkanediols which contain, as a co-component, certain dicarboxylic acid diamides, a process for the manufacture of the new copolyesters and the use of these copolyesters, which are valuable thermoplastic materials.

Thermoplastic polyesters of terephthalic acid and aliphatic diols such as, for example, poly(ethylene terephthalates) and poly(butylene terephthalates), and their use in industry as "engineering thermoplastic" materials, are known. These polyesters, from which mouldings having good mechanical properties can be manufactured, however suffer from disadvantages. Thus, in general, the glass transition point or glass transition range of these polyesters, especially of the poly(butylene terephthalates), is very low, which is considered to be a disadvantage in numerous technical applications, since the mouldings lose their stiffness already at relatively low temperatures. A further disadvantage, especially of the known poly(ethylene terephthalates), is that rather high temperatures are required to process them.

It is also known that the properties of conventional polyalkylene terephthalates can be modified in the desired manner by the incorporation of aliphatic diamines. Thus it has already been proposed, in U.S. Pat. No. 2,925,405, to manufacture such linear polyesters by polycondensing certain terephthalic acid diesterdiamides, obtained by reaction of 2 mols of dimethyl terephthalate with 1 mol of an alkylene diamine, with alkanediols. However, the polyesters containing amide groups, obtained by this process, still show relatively high melting points with only a slight rise in the glass transition points or glass transition ranges.

It has now been found that new copolyesters with more advantageous properties are obtained when terephthalic acid, isophthalic acid or their polyester-forming derivatives, mixed with a certain amount of certain dicarboxylic acid diamide compounds, are copolymerised with alkanediols. The copolyesters according to the invention are distinguished, both compared to the conventional polyalkylene terephthalates and compared to the polyalkylene terephthalates modified with aliphatic diamines, by higher glass transition temperatures and lower melting points or softening points, that is to say they display better thermo-mechanical properties coupled with better processability.

Accordingly, the present invention relates to new, linear, thermoplastic copolyesters containing amide groups, based on terephthalic acid and/or isophthalic acid and alkanediols containing 2–10 C atoms, characterised in that they contain, as the co-component, 5–90 mol %, relative to the total molar amount of the dicarboxylic acid components, of a dicarboxylic acid diamide radical of the formula I

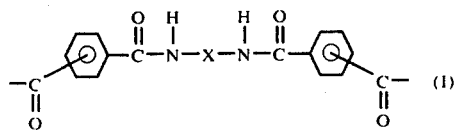

wherein the two carbonyl groups located on the aromatic ring are in the para-position or meta-position to one another and X denotes an aromatic, cycloaliphatic or cycloaliphatic-aliphatic radical.

Preferably, the invention relates to copolyesters based on polyalkylene terephthalates and/or polyalkylene isophthalates with 2–6 C atoms in the alkylene radical, with the proportion of the co-component being 5–75 mol % of a dicarboxylic acid diamide radical of the formula I and X in the formula I denoting a cycloaliphatic or cycloaliphatic-aliphatic radical.

The new copolyesters containing amide groups are obtained by polycondensing terephthalic acid, isophthalic acid or their polyester-forming derivatives, mixed with 5–90 mol %, based on the total molar amount of the dicarboxylic acid components, of a dicarboxylic acid diamide compound of the formula II

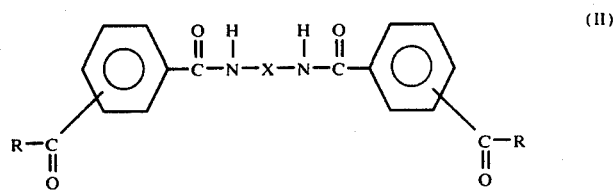

wherein the two carbonyl groups located on the aromatic ring are in the para-position or meta-position to one another, R denotes the hydroxyl group or methoxy group or a chlorine atom and X denotes an aromatic, cycloaliphatic or cycloaliphatic-aliphatic radical, in about equimolar amounts with alkanediols containing 2–10 C atoms, in the presence of a catalyst, in a known manner, to a relative viscosity greater than 1.2 (specific viscosity greater than 0.2), measured at 30° C on a 1% strength solution consisting of 50 parts of phenol and 50 parts of tetrachloroethane.

Preferably, terephthalic acid, isophthalic acid or their polyester-forming derivatives, mixed with 5–75 mol %, based on the total molar amount of the dicarboxylic acid components, of a dicarboxylic acid diamide compound of the formula II, wherein X denotes a cycloaliphatic or cycloaliphatic-aliphatic radical, are polycondensed with alkanediols which contain 2–6 C atoms in the molecule.

The polyester-forming derivatives of terephthalic acid and isophthalic acid which are used in the process are in the main the low molecular dialkyl esters which contain 1 to 4 carbon atoms in the alkyl group, but preferably the dimethyl esters. Further suitable polyester-forming derivatives are also the acid dihalides, especially the acid dichlorides, and the anhydrides of terephthalic acid and isophthalic acid.

The dicarboxylic acid diamide compounds of the formula II are known compounds and can be obtained, for example, in accordance with the processes described in German Offenlegungsschrift No. 2,150,808 and U.S. Pat. No. 2,925,405 by reaction of 1 mol of a diamine of the formula III

wherein X has the same meaning as in the formula I, with 2 mols of terephthalic acid, isophthalic acid or their derivatives which form the carboxylic acid amide group.

As derivatives which form carboxylic acid amide groups it is possible to use the same derivatives as are used to manufacture the copolyesters. If, in the manufacture of the dicarboxylic acid diamide compound of the formula II, the terephthalic acid dialkyl esters or isophthalic acid dialkyl esters are used as starting materials, then these are advantageously used in a 1–5-fold molar excess. When using terephthalic or isophthalic acid monomethyl ester monochloride as the starting material, this material is preferably reacted with the diamine of the formula III in a molar ratio of 2:1.

Examples of suitable diamines of the formula III which may be mentioned are the aromatic diamines such as, for example, p- and m-phenylenediamine, p- and m-toluylenediamine and p- and m-xylylenediamine.

The following may be mentioned as examples of particularly suitable cycloaliphatic or cycloaliphatic-aliphatic diamines: 3-aminomethyl-3,5,5-trimethylcyclohexylamine ("isophoronediamine"), bis-(4-amino-3-methylcyclohexyl)-methane, 2,2-bis-(4-aminocyclohexyl)-propane, bis-(4-aminocyclohexyl)-methane, 1,8-diamino-p-methane, 2-aminomethyl-cyclopentylamine, 1,3-cyclohexylenediamine, 1,4-cyclohexylenediamine, 2-methyl-1,3-cyclohexylenediamine, 2-methyl-1,4-cyclohexylenediamine, 1,3-cyclopentylenediamine, 1,3-cycloheptylenediamine and 1,4-cycloheptylenediamine.

The new copolyesters can be manufactured according to various known processes, for example by solution condensation or azeotropic condensation, by phase boundary condensation, melt condensation or solid phase condensation or by a combination of these methods, depending on which starting compounds and reaction catalysts are used.

The new copolyesters are preferably manufactured by esterifying or trans-esterifying terephthalic acid, isophthalic acid or their low molecular dialkyl esters, preferably the dimethyl esters, mixed with the dicarboxylic acid diamides of the formula II and the alkanediols, in an inert atmosphere, for example a nitrogen atmosphere, in the presence of catalysts, at 150°–220° C, with simultaneous removal of the water or alkanol produced, and subsequently carrying out the polycondensation at 200°–270° C under reduced pressure in the presence of certain catalysts until the polycondensates have the desired viscosity.

Preferably, when manufacturing copolyesters by this process, the alkanediols are used in excess, so that after the esterification reaction or trans-esterification reaction essentially monomeric alkanediol esters of the two dicarboxylic acid components are obtained, which are then polycondensed in the presence of a polycondensation catalyst, whilst distilling off the excess alkanediol in vacuo.

As esterification catalysts it is possible to use, in a known manner, inorganic or organic acids, for example sulphuric acid or p-toluenesulphonic acid, or metal compounds, which are also suitable for use as trans-esterification catalysts.

Since some catalysts preferentially accelerate the transesterification and others the polycondensation, it is advantageous to use a combination of several catalysts. Examples of suitable trans-esterification catalysts are the oxides, salts or organic compounds of the metals calcium, magnesium, zinc, cadmium, manganese and cobalt. The metals as such can also be used as catalysts. On the other hand, the polycondensation is preferably catalysed by lead, titanium, germanium and especially antimony or their compounds. These catalysts can be added to the reaction mixture together or separately, that is to say before or after the esterification or trans-esterification. These catalysts are employed in amounts of about 0.001 to 1.0 per cent by weight, relative to the dicarboxylic acid components.

The new copolyesters can also be manufactured by condensing the starting compounds in the melt until a certain viscosity is reached, then granulating the polycondensate, for example with the aid of an underwater granulator, drying the granules and then subjecting them to a solid phase condensation, a vacuum, and temperatures below the melting point of the granules, being used. Higher viscosities of the polyesters are also achieved thereby.

Another process for the manufacture of the new copolyesters consists of polycondensing the terephthalic acid dihalides or isophthalic acid dihalides, preferably the acid dichlorides, mixed with the dicarboxylic acid dichloride or dicarboxylic acid monomethyl ester monochloride of the dicarboxylic acid diamide of the formula II and with the alkanediols, in a solvent and in the presence of a basic catalyst in the temperature range of 0° to 100° C, with elimination of hydrogen halide and whilst distilling off the methanol which may be formed. Tertiary amines or quaternary ammonium salts are preferably used as basic catalysts. The proportion of the basic catalyst can be from 0.1 to 20 mol %, relative to the acid halides. Such condensations can also be carried out in the melt, without using a solvent.

The polycondensation reaction is carried out until the copolyesters have a relative viscosity higher than 1.2 (specific viscosity higher than 0.2). The reaction times are about 30 minutes to several hours, depending on the nature of the catalyst used and the size of the batch. After removal from the reaction vessel, the polyester melt obtained is granulated or shredded in the customary manner.

The polycondensation reaction can also be carried out discontinuously, it being possible to take all the remaining known measures, such as addition of inert fillers, flame-proofing additives, pigments and the like, already during the last stages of condensation, for example in the solid phase condensation or at the end of the melt condensation.

When working up the polyester melt or even before the polycondensation reaction, it is possible to add inert additives of all kinds to the reaction mass such as, for example, fillers, reinforcing materials, especially glass fibres, inorganic or organic pigments, optical brighteners, delustering agents and flameproofing or flame-retarding additives.

Depending on the starting materials used, the copolyesters according to the invention have predominantly crystalline or predominantly amorphous zones. Unless they contain coloured additives, the new copolyesters are colourless to pale yellow and are hard, thermoplastic materials from which moulded materials with valuable thermo-mechanical properties can be manufactured by the customary moulding processes, such as casting, injection moulding and extrusion.

The new copolyesters are particularly suitable for use as "engineering plastic" materials which are suitable for the manufacture of shaped articles, such as cogwheels, containers for chemicals or food, machine parts and parts of apparatus, foils, sheets, films and hot-melt adhesives, and also for the manufacture of semi-finished products which can be machined.

The copolyesters prepared in the examples which follow are characterised more exactly by the following characteristic values:

The copolyesters are characterised by those morphological changes which are measured by means of differential thermoanalysis on a sample which is heat-treated for 3 minutes at 30° C above the melting point or softening point and is then rapidly chilled. The chilled sample is heated at a heating-up speed of 16° C/minute by means of a "DSC-2" differential calorimeter of Messrs. Perkin-Elmer. The glass transition range (Tg) is determined from the thermogram of the sample as the range in the thermogram where the specific heat increases suddenly. The specific viscosity (relative viscosity −1) of the polycondensates is determined at 30° C on solutions of 1 g of copolyester in 100 ml of a mixture consisting of equal parts of phenol and tetrachloroethane. The softening point is determined on a microscope with a heated stage at a heating-up speed of 15° C/minute, a cross being formed from 2 filaments and the softening point being designated as the temperature at which the sharp angles of the cross disappear. The softening points can also be determined by means of the Kofler bench.

Preparation of the dicarboxylic acid diamide compounds

EXAMPLE A

N,N'-bis-(4-carbomethoxybenzoyl)-isophoronediamine

A solution, cooled to 5° C, of 180 g (0.9 mol) of terephthalic acid monomethyl ester monochloride in 2.5 liters of benzene is intensively stirred in a laboratory glass stirring apparatus fitted with a reflux condenser, a thermometer and a dropping funnel. A solution of 76.5 g (0.45 mol) of isophoronediamine (3-aminomethyl-3,5,5-trimethylcyclohexylamine) and 126 ml (0.9 mol) of triethylamine in 270 ml of benzene is added dropwise over the course of 1.5 hours to the above solution with external cooling by means of ice water. The temperature of the reaction mixture rises in the course thereof to 18°–19° C and a colourless suspension is formed. After the dropwise addition, the mixture is stirred for 1 hour at room temperature and then for a further 1.5 hours at 60°–80° C. It is then cooled to room temperature and the precipitate is isolated by suction filtration. The colourless, pulverulent mass is now suspended in 2.4 liters of water and the mixture is stirred intensively for 30 minutes to remove the triethylamine hydrochloride.

It is now filtered, and the product is sucked dry. The crude product thus obtained is recrystallised from 1 liter of methanol (small amounts of insoluble constituents are discarded) and is dried in vacuo (50 mm Hg) at 70° C for 12 hours. 144.7 g (65.2% of theory) of a fine white powder which melts at 204°–207° C are thus obtained.

For further purification, the product is boiled up in 1.1 liters of methanol and after cooling to room temperature is filtered off and dried for 12 hours at 120° C under 50 mm Hg.

127.8 g of pure substance (57.6% of theory) are thus obtained in the form of a crystalline, colourless powder which melts at 208°–210° C. The microanalysis shows:

| found | calculated |
|---|---|
| 67.9% C | 67.99% C |
| 6.8% H | 6.93% H |
| 5.6% N | 5.66% N |

The diester diamide thus obtained has the following structure:

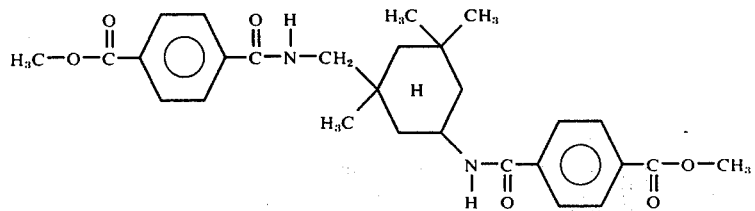

EXAMPLE B

N,N'-bis-(4-carbomethoxybenzoyl)-4,4'-diamino-3,3'-dimethyldicyclohexylmethane

The following are reacted in accordance with the instruction given in Example A: 238.2 g (1.2 mols) of terephthalic acid monomethyl ester monochloride dissolved in 2.6 liters of benzene, with 143 g (0.6 mol) of 4,4'-diamino-3,3'-dimethyldicyclohexylmethane ("Lamomin C260"), and 151.2 ml of triethylamine dissolved in a mixture of 600 ml of benzene and 600 ml of acetone.

After working up according to Example A, the product obtained is recrystallised from 500 ml of dimethylformamide.

122.5 g (36.3% of theory) of a colourless powder which melts at 293° to 295° C are obtained. The elementary analysis gives the following values:

| found | calculated |
|---|---|
| 70.3% C | 70.44% C |
| 7.6% H | 7.52% H |

| found | calculated |
|---|---|
| 5.0% N | 4.98% N | so that the molecule has the following structure:

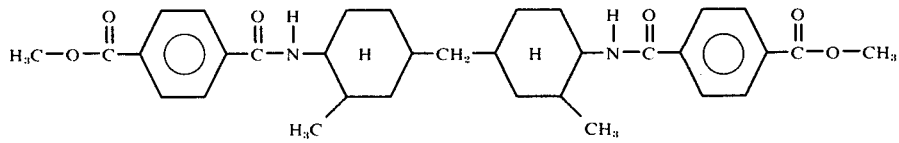

EXAMPLE C

N,N'-bis-(4-carbomethoxybenzoyl)-m-phenylenediamine

The following are reacted in accordance with the instruction given in Example A: 180 g of terephthalic acid monomethyl ester monochloride (0.9 mol) dissolved in 1.8 liters of benzene, with 48.6 g of m-phenylenediamine (0.45 mol) and 126 ml of triethylamine in a mixture of 450 ml of benzene and 450 ml of acetone.

The mixture is worked up according to Example A and the product obtained is subsequently recrystallised from 6 liters of dimethylformamide/n-butanol (1:1). The resulting product is dried for 12 hours at 90° C/50 mm Hg. 170.6 g (87.7% of theory) of practically colourless crystals of melting point 307°–309° C are obtained. Results of the analysis by combustion agree with the following structure:

| found | calculated |
|---|---|
| 66.7% C | 66.66% C |
| 4.7% H | 4.66% H |
| 6.8% N | 6.48% N |

EXAMPLE D

N,N'-bis-(4-carbomethoxybenzoyl)-2-aminomethylcyclopentylamine

The following two solutions are reacted in accordance with the working instruction given in Example A: 205 g (1.03 mols) of terephthalic acid monomethyl ester monochloride in 2,750 ml of benzene, and 57 g (0.5 mol) of 2-aminomethyl-1-cyclopentylamine and 140 ml of triethylamine (1.0 mol) in 300 ml of benzene.

The reaction mixture is worked up as follows: 50 ml of ether are added thereto, the precipitate is filtered off and dissolved in 1.5 liters of chloroform and the solution is extracted with three times 200 ml of water, concentrated to 700 ml and cooled.

145.8 g (66.5% of theory) of the crude bis-ester-amide are thus obtained in the form of yellowish crystals (melting point: 179°–185° C). A sufficiently pure product can be obtained by subsequent drying for 48 hours at 100° C; it melts at 186°–188° C and the elementary analysis gives the following values for $C_{24}N_{26}N_2O_6$:

| found | calculated |
|---|---|
| 65.1% C | 65.7% C |
| 5.9% H | 5.98% H |
| 6.3% N | 6.4% N |

Accordingly the product has the following formula:

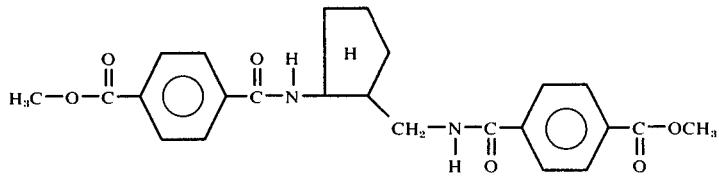

EXAMPLE E

N,N'-bis-(4-carbomethoxybenzoyl)-4,4-diaminodicyclohexylmethane

The following two solutions are reacted analogously to Example A: 205 g (1.03 mols) of terephthalic acid monomethyl ester monochloride in 2.75 liters of benzene, with 105 g (0.5 mol) of 4,4'-diamino-dicyclohexylmethane and 140 ml of triethylamine (1.0 mol) in 300 ml of benzene.

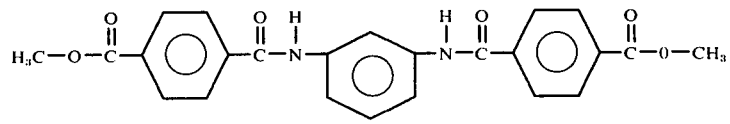

After working up according to Example A, 211.2 g (79.1% of theory) of yellow crystals (melting point: 215° C–250° C) are obtained. These are purified by dissolving in 2 liters of dimethylformamide, boiling the solution with charcoal, filtering it, adding 2 liters of butanol, cooling the mixture and filtering off and drying the product. Colourless crystals of melting point above 300° C are obtained.

The elementary analysis gives, for $C_{31}H_{38}N_2O_6$:

| found | calculated |
|---|---|
| 69.70% C | 69.64% C |
| 7.15% H | 7.16% H |
| 5.20% N | 5.23% N |

Accordingly, the product has the following formula:

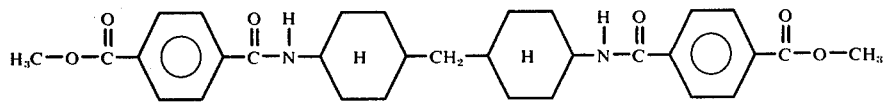

Preparation of the copolyesters containing amide groups

EXAMPLE 1

Copolyester containing 10 mol % of dicarboxylic acid diamide according to Example A A mixture of 150.1 g (0.774 mol) of dimethyl terephthalate (DMT), 42.5 g (0.086 mol) of the N,N'-bis-(4-carbomethoxybenzoyl)-isophoronediamine prepared according to Example A, 0.053 g of zinc acetate, 0.06 g of antimony trioxide and 132.2 g (2.15 mols) of ethylene glycol is warmed from 160° to 186° C over the course of 2 hours whilst stirring and passing nitrogen over the mixture, with methanol distilling off; approx. 50 g of the latter can be collected. The temperature is then raised to 218° C over the course of a further 2 hours, during which a further 6 g of methanol are collected. The mixture is then heated to 260° C under a partial vacuum, the vacuum being improved from 200 mm Hg to 0.75 mm Hg over the course of 1.5 hours. Finally, the mixture is stirred for a further 30 minutes at 260°–265° C under 0.75 mm Hg.

The hot melt is poured out on a metal sheet to cool and the portion remaining in the reaction vessel is removed after cooling.

An amorphous, clear, transparent, pale yellowish-coloured copolyester, of which the relative viscosity $\eta_{rel.} = 1.51$, measured at 30° C on a 1% strength solution consisting of equal parts of phenol and tetrachloroethane, is obtained in almost quantitative yield. The copolyester has a glass transition range (Tg) of 87°–95° C ("DSC 2"; Perkin-Elmer), whilst a customary polyethylene terephthalate homopolyester has a Tg of approx. 74° C.

COMPARATIVE EXAMPLE

N,N'-Bis-(4-carbomethoxybenzoyl)-ethylenediamine is prepared analogously to Example A. The diester diamide thus obtained, of the following structure:

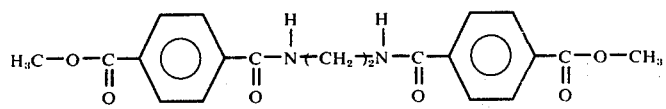

is polycondensed exactly in accordance with the working instruction given in Example 1, using a mixture of the following composition: 150.1 g of DMT (0.774 mol), 33.06 g of N,N'-bis-(4-carbomethoxybenzoyl)-ethylenediamine (0.086 mol), 0.053 g of zinc acetate, 0.06 g of antimony trioxide and 132.2 g of ethylene glycol. A copolyester is obtained which in comparison to conventional polyethylene terephthalate and to the copolyester according to the invention (Example 1) displays the following data:

| | Copolyester according to comparative example | Copolyester according to Example 1 | Polyethylene terephthalate |
|---|---|---|---|
| $\eta$rel. | 1.65 | 1.51 | 1.80 |
| Tg | 74° C | 87–95° C | 74° C |

In contrast to the copolyester according to the invention, the copolyester prepared by way of comparison using 10 mol % of N,N'-bis-(4-carbomethoxybenzoyl)-ethylenediamine does not show any rise in the glass transition temperature (Tg) compared to customary polyethylene terephthalate.

EXAMPLE 2

Copolyester containing 10 mol % of dicarboxylic acid diamide according to Example C A mixture of 150.1 g of DMT (0.774 mol), 37.2 g of the N,N'-bis-(4-carbomethoxybenzoyl)-m-phenylenediamine (0.086 mol) prepared according to Example C, 180 g of 1,4-butanediol (2.0 mols) and 0.09 g of tetraisopropyl orthotitanate is reacted under nitrogen, analogously to the procedure described in Example 1, in accordance with the following temperature programme: 1 hour rising from 160° C to 230° C, + 1 hour at 240° C and 200 mm Hg → 70 mm Hg, and 1 hour at 250°–255° C at 55 mm Hg → 0.4 mm Hg.

The product is treated in accordance with Example 1 and a hard, partially crystalline copolyester of light yellow colour is obtained. Its characteristic values, determined according to Example 1, are:

$\eta_{spec}$: 0.64
Tg: 37° C
Softening point (Sp) 200° C (according to Kofler)
Nitrogen content: found: 1.1% N; calculated: 1.15% N.

By way of comparison, a conventional polybutylene terephthalate homopolyester has a Tg of approx. 22° C.

EXAMPLE 3

Copolyester containing 10 mol % of dicarboxylic acid diamide according to Example B A mixture of 150.1 g of DMT (0.774 mol), 48.4 g of the N,N'-bis-(4-carbomethoxybenzoyl)-4,4'-diamino-3,3'-dimethyldicyclohexylmethane prepared according to Example B, 180 g of 1,4-butanediol and 0.09 g of tetraisopropyl orthotitanate is condensed analogously to Example 2, in accordance with the following temperature programme: 2 hours: 140° C → 215° C; 1 hour: 215° C → 230° C and 200 mm Hg → 40 mm Hg; and 1 hour: 230° C → 235° C and 40 mm Hg → 0.5 mm Hg.

The copolyester thus obtained is characterised as follows:

Appearance: colourless, partially crystalline, very glossy surface.
$\eta_{spec}$: 0.53
Tg: 143°–155° C
Sp: 198° C

EXAMPLES 4–6

Copolyester containing 10, 25 and 50 mol % of dicarboxylic acid diamide according to Example A DMT and the N,N'-bis-(4-carbomethoxybenzoyl)-isophoronediamine prepared according to Example A are reacted with 1,4-butanediol and tetraisopropyl orthotitanate in accordance with the temperature programme and process described in Example 2. Depending on the DMT/diester diamide ratio, copolyesters with the following properties are obtained:

| Example | Mol % of diester diamide, relative to 100 mol % of the total dicarboxylic acid component | Colour | Appearance | Tg | Sp |
| --- | --- | --- | --- | --- | --- |
| 4 | 10 | colourless | partially crystalline | 44° C | 196° C |
| 5 | 25 | pale yellow | clear, transparent, amorphous | 68° C | approx. 198° C |
| 6 | 50 | pale yellow | clear, transparent, amorphous | 92–106° C | 184° C |

COMPARATIVE EXAMPLE

A copolyester prepared analogously to Example 5, containing 25 mol % of N,N'-bis-(4-carbomethoxybenzoyl)-ethylenediamine gives the following results in comparison to copolyesters of the invention, according to Example 5:

|  | Copolyester according to comparative example | Copolyester according to Example 5 | Polybutylene terephthalate |
| --- | --- | --- | --- |
| $\eta$rel. | 1.6 | 1.6 | 2.0 |
| Tg | 44° C | 68° C | 24° C |
| Sp | 205° C | approx. 198° C | 224° C |

The comparison shows that if a dicarboxylic acid diamide prepared from dimethyl terephthalate and ethylenediamine is used as the co-component, a copolyester with relatively lower glass transition point is obtained.

EXAMPLE 7

Copolyester containing 50 mol % of the dicarboxylic acid diamide according to Example D The following mixture is subjected to trans-esterification and polycondensation in accordance with the temperature programme and process carried out in Example 2: 9.7 g (0.05 mol) of DMT, 21.9 g of N,N'-bis-(4-carbomethoxybenzoyl)-2-aminomethyl-1-cyclopentylamine (0.05 mol), 108 g of 1,4-butanediol and 0.1 ml of tetraisopropyl orthotitanate.

The copolyester is obtained as a slightly discoloured brittle material.

For purification, 10 g of the copolyester are dissolved in 100 ml of boiling tetrachloroethane, the solution is filtered and the product is precipitated with 800 ml of petroleum ether. The light-coloured precipitate thus obtained is dried. It softens at 225° C and its relative viscosity is 1.15. The glass transition point is 43° C.

EXAMPLE 8

Copolyester containing 75 mol % of dicarboxylic acid diamide according to Example E and 50 mol % of 1,10-decanediol.

A mixture of 4.85 g (0.025 mol) of DMT, 40.1 g (0.075 mol) of N,N'-bis-(4-carbomethoxybenzoyl)-4,4-diaminodicyclohexylmethane, 8.7 g (0.05 mol) of 1,10-decanediol, 117 g of 1,4-butanediol and 0.2 ml of tetraisopropyl orthotitanate is condensed in accordance with the following temperature programme: 2.5 hours/150 → 200° C/N$_2$/normal pressure, 4 hours/200 → 240° C/N$_2$/normal pressure → 50 mm Hg and 1 hour/240 → 300° C/50 mm Hg → 0.5 mm Hg.

The copolyester thus obtained is reprecipitated from tetrachloroethane/petroleum ether and is obtained in the form of a light yellow product which has the following properties:
Relative viscosity: 1.24
Softening point (Kofler): 180° C
Glass transition temperature: 55°–83° C

COMPARATIVE EXAMPLE

Polyester-amide according to DT-OS No. 2,150,808, Example 13, from N,N'-p-carbobutoxybenzoyldodecamethylenediamine and 1,12-dodecanediol.

A fibre polyester of regular polyester-amides was prepared as follows, for comparison: 87.33 g (0.143 mol) of N,N'-p-carbobutoxybenzoyl-dodecamethylenediamine (prepared according to Example 1, DOS No. 2,150,808) are degassed and 72.33 g of 1,12-dodecanediol + 0.143 ml of an 0.2 .. solution of tetrabutyl titanate in butanol are added under N$_2$. The mixture is treated as follows, whilst stirring: 5 hours at 195° C → 205° C, N$_2$, normal pressure; 1 hour at 205° C → 235° C, N$_2$, 750 mm Hg → 0.5 mm Hg; 1 hour at 235° C → 272° C, N$_2$, 0.3 mm Hg.

The resulting light-coloured partly crystalline polyester has a relative viscosity of 2.44 (measured in phenol/tetrachloroethane at 30° C). The resulting product is thus identical with the product described in DT-OS No. 2,150,808. The following properties are found:

| Glass transition range Tg (° C) | as obtained | = 40–49 |
| --- | --- | --- |
| Glass transition range Tg (° C) | after heat-treatment | = 37–56 |
| Melting point |  | = 193° C |

| Softening point (Kofler) | = 192° C. |
|---|---|

This pure, regular polyester-amide, whilst it has good properties as a fibre polyester, cannot be used as a high quality "engineering plastics" material because of its low Tg value.

EXAMPLE 9

Copolyester containing 75 mol % of dicarboxylic acid diamide according to Example D The following mixture is trans-esterified and polycondensed in accordance with the temperature programme below: 78.9 g (0.18 mol) of N,N'-bis-(4-carbomethoxybenzoyl)-2-aminomethylcyclopentylamine, 11.6 g (0.06 mol) of DMT, 130 g (1.44 mol) of butanediol and 0.03 g of tetraisopropyl orthotitanate.

The temperature programme is: 10 hours: 150° C → 220° C/N$_2$/normal pressure; 4 hours: 220° C → 235° C/760 mm Hg → 100 mm Hg; 1 hour: 235° C/100 mm Hg → 20 mm Hg; 4 hours: 235° C → 250° C/20 mm Hg → 0.4 mm Hg.

90 g of a hard light-yellow coloured copolyester having the following properties are thus obtained:

Relative viscosity: 1.23
Softening point (Kofler): 150° C
Glass transition temperature: 95°–110° C.

EXAMPLE 10

Copolyester containing 90 mol % of dicarboxylic acid diamide according to Example E A mixture of 1.94 g (0.01 mol) of DMT, 48.1 g (0.09 mol) of N,N'-bis-(4-carbomethoxybenzoyl)-4,4-diaminodicyclohexylmethane, 326 g of 1,4-butanediol (3.8 mols) and 0.45 g of tetraisopropyl orthotitanate is trans-esterified, and polycondensed, according to Example 9.

The resulting polycondensate is dark in colour and is purified by reprecipitation from dimethylformamide/methanol, and dried. The resulting product is a yellow copolyester with the following properties:

Relative viscosity: 1.27
Softening point (Kofler): 212° C
Glass transition temperature: 130°–162° C.

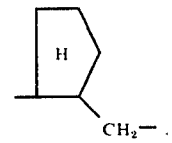

I claim:

1. A linear, thermoplastic random copolyester containing amide groups bases on polyalkylene terephthalates and/or polyalkytene isophthalates, with 2 to 6 C atoms in the alkylene, characterized in that it contains, as the cocomponent, 5–75 mole %, relative to the total molar amount of the dicarboxylic acid components, of a dicarboxylic acid diamide radical of the formula I

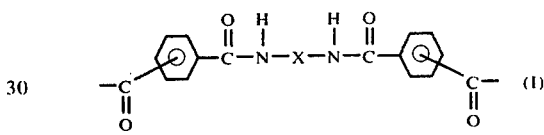

wherein the two carbonyl groups located on the aromatic ring are in the para-position or meta-position to one another and X is a cycloaliphatic or cycloaliphatic-aliphatic radical.

2. A copolyester according to claim 1, characterised in that X in the formula I denotes a radical selected from the group consisting of the formulae

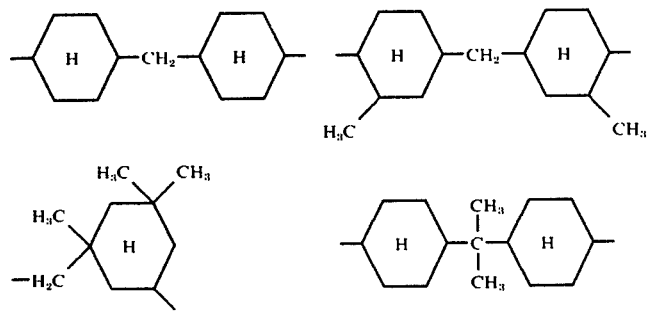

and